(12) United States Patent
Agrawal et al.

(10) Patent No.: US 11,443,060 B2
(45) Date of Patent: Sep. 13, 2022

(54) NOTE TAKING AT A DEVICE BASED ON WHETHER THE USER IS A KNOWN USER, UNKNOWN USER, OR OWNER

(71) Applicant: Motorola Mobility LLC, Chicago, IL (US)

(72) Inventors: Amit Kumar Agrawal, Bangalore (IN); Alexandre Neves Creto, São Paulo (BR)

(73) Assignee: Motorola Mobility LLC, Chicago, IL (US)

( * ) Notice: Subject to any disclaimer, the term of this patent is extended or adjusted under 35 U.S.C. 154(b) by 329 days.

(21) Appl. No.: 16/667,434

(22) Filed: Oct. 29, 2019

(65) Prior Publication Data

US 2021/0124839 A1 Apr. 29, 2021

(51) Int. Cl.
| | |
|---|---|
| G06F 21/62 | (2013.01) |
| G06F 21/31 | (2013.01) |
| H04W 12/08 | (2021.01) |
| H04W 12/69 | (2021.01) |
| G06F 40/169 | (2020.01) |
| G06V 40/16 | (2022.01) |
| G06F 21/32 | (2013.01) |
| G06F 3/04883 | (2022.01) |
| G06F 3/0354 | (2013.01) |

(52) U.S. Cl.
CPC .......... *G06F 21/6245* (2013.01); *G06F 21/31* (2013.01); *G06F 21/629* (2013.01); *G06F 40/169* (2020.01); *G06V 40/172* (2022.01); *H04W 12/08* (2013.01); *H04W 12/69* (2021.01); *G06F 3/03545* (2013.01); *G06F 3/04883* (2013.01); *G06F 21/32* (2013.01)

(58) Field of Classification Search
CPC .... G06F 21/6245; G06F 21/31; G06F 21/629; G06F 21/32; G06F 40/169; G06F 3/03545; G06F 3/04883; H04W 12/69; H04W 12/08; G06K 9/00288
See application file for complete search history.

(56) References Cited

U.S. PATENT DOCUMENTS

| | | | | |
|---|---|---|---|---|
| 6,970,583 | B2 * | 11/2005 | Black | G07F 7/1008 382/124 |
| 8,429,078 | B2 * | 4/2013 | Evans | G06Q 20/40145 705/44 |
| 9,372,571 | B2 | 6/2016 | Williams et al. | |
| 9,665,205 | B1 * | 5/2017 | Sinkov | G06F 3/0393 |
| 10,452,830 | B2 * | 10/2019 | Raghunath | G06F 3/03545 |

(Continued)

*Primary Examiner* — Hosuk Song
(74) *Attorney, Agent, or Firm* — FIG. 1 Patents

(57) ABSTRACT

When a user approaches or accesses a device, the device attempts to recognize the user. A multi-user note management system takes different actions based on whether the user is recognized as the owner of the device, is recognized as a known user of the device, or is determined to be an unknown user of the device. If the user is recognized as the owner or a known user, the system receives user input and stores the user input as a note. If the user is an unknown user, the system does not allow the user to leave a note at the device, or receives user input and captures an image of the user, and stores the user input as a note associated with the captured image. When the owner of the device unlocks the device after a note has been left, the system displays or otherwise presents the notes.

20 Claims, 9 Drawing Sheets

(56) References Cited

U.S. PATENT DOCUMENTS

| | | | |
|---|---|---|---|
| 10,817,081 B2* | 10/2020 | Kolarov | G06F 21/33 |
| 2002/0095586 A1* | 7/2002 | Doyle | G06F 21/32 |
| | | | 713/186 |
| 2016/0379463 A1 | 12/2016 | Agrawal et al. | |
| 2017/0024574 A1 | 1/2017 | Agrawal et al. | |
| 2017/0193982 A1 | 7/2017 | Agrawal et al. | |
| 2017/0286704 A1* | 10/2017 | Kumar | G06F 21/35 |
| 2018/0367491 A1 | 12/2018 | Agrawal et al. | |

* cited by examiner

Option 1

Option 2

NOTE TAKING AT A DEVICE BASED ON WHETHER THE USER IS A KNOWN USER, UNKNOWN USER, OR OWNER

BACKGROUND

There are various ways of giving reminders and notes to people, such as by sending a quick text message or email to a person's mobile phone, leaving a handwritten sticky note, or verbally telling them in person. But these approaches can be problematic in various situations. For example, the person that wants to give the reminder or note may not have a mobile phone with them (e.g., children or someone who forgot his phone), a handwritten sticky note is left in a location where the intended recipient does not see the note, or the intended recipient is not able to hear the person. For example, in the morning a child might try to tell his parent he needs to be picked up at a particular time after school by leaving a handwritten sticky note in a location where his parent does not see the note or by trying to yell through the bathroom door while the parent is in the shower. Situations like these can result in the intended recipient of the reminder or note not receiving the information they need.

BRIEF DESCRIPTION OF THE DRAWINGS

Embodiments of note taking at a device based on whether the user is a known user, unknown user, or owner are described with reference to the following drawings. The same numbers are used throughout the drawings to reference like features and components.

DETAILED DESCRIPTION

Figure 1:
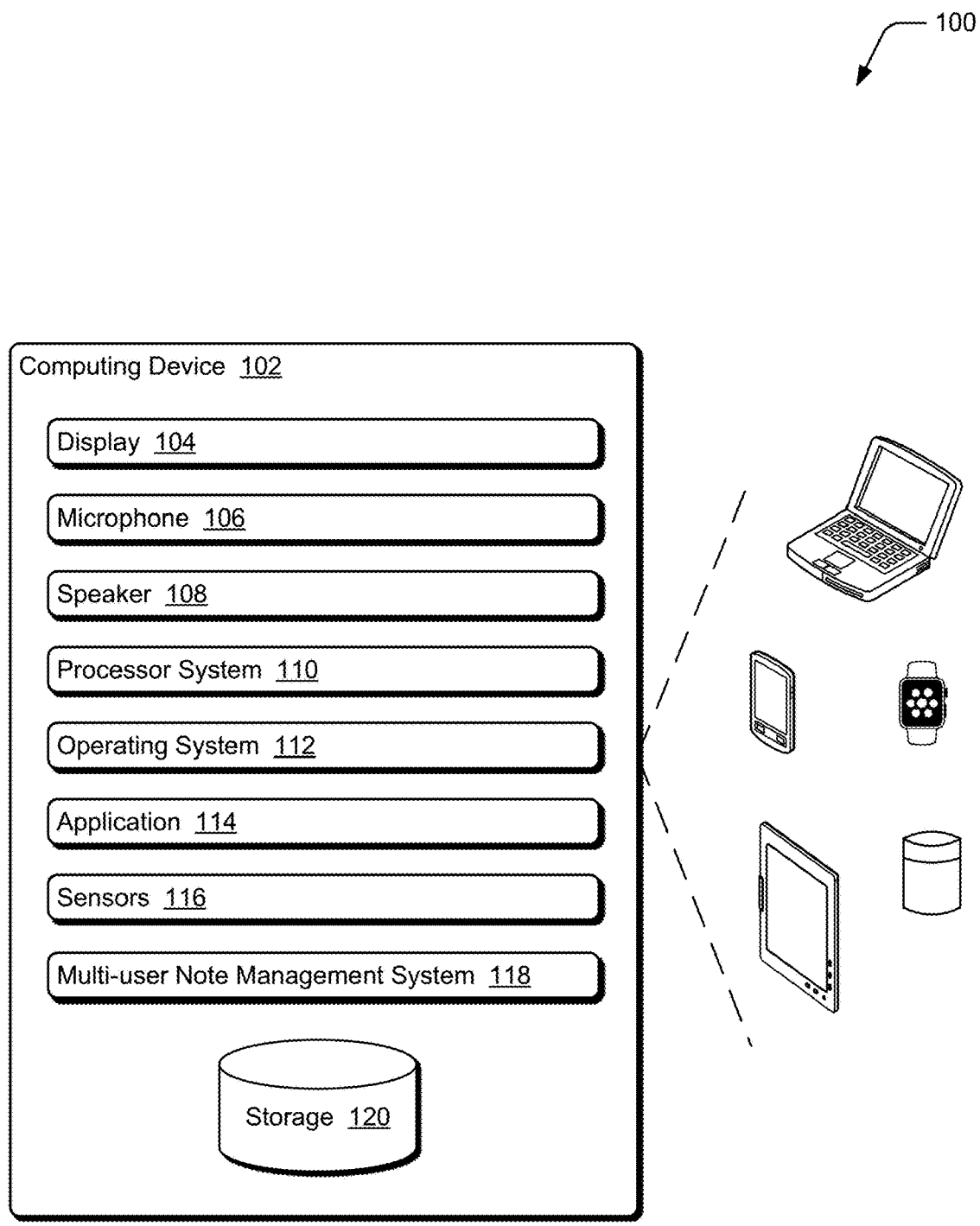
FIG. 1 illustrates an example computing device implementing the techniques discussed herein.

Note taking at a device based on whether the user is a known user, unknown user, or owner is discussed herein. A device has a particular primary user that is referred to in the discussions herein as the owner of the device. The owner authenticates himself or herself to the device in order to unlock the device and access the full functionality of the device. The owner of the device can be, but need not be, the person that purchased the device. The device also maintains a record of known users. Known users refer to users that are identified using some user recognition technique, such as face recognition. Known users differ from the owner in that known users cannot be authenticated to unlock the device. Known users have access to note taking functionality of the device as discussed in more detail below, but do not have access to full functionality of the device.

Note taking refers to the ability to leave a note on the device. This note can be any of a variety of different types of digital content, such as text, characters, or drawings input via a touchscreen of the device (e.g., using a finger or stylus). Additionally or alternatively, the note can be other types of digital content, such as audio inputs, video inputs, and so forth. A note left on the device is recorded and stored by the device for later consumption by (e.g., display or other presentation) the owner.

When a user approaches or accesses the device (e.g., removes a stylus from a storage location of the device), the device attempts to recognize the user. A multi-user note management system takes different actions based on whether the user is recognized as the owner of the device, is recognized as a known user of the device, or is determined to be an unknown user of the device. If the user is recognized as the owner of the device, the multi-user note management system receives user input and stores the user input as a note in a particular location on the device (e.g., a folder in which data is stored for a note taking application).

If the user is recognized as a known user of the device, the multi-user note management system receives user input and stores the user input as a note in a storage location (e.g., a folder) associated with the multi-user note management system. The note is tagged with metadata identifying the known user. The user can optionally leave multiple notes and can return to the device, prior to the owner consuming a note, and edit the note. However, in one or more embodiments the multi-user note management system allows a known user to view, play back, or edit only notes left by that user—notes left by other users cannot be accessed.

If the user is an unknown user of the device, in one or more embodiments the multi-user note management system does not allow the user to leave a note at the device. Additionally or alternatively, the multi-user note management system may receive user input and store the user input as a note in a storage location (e.g., a folder) associated with the multi-user note management system. A digital image of the unknown user is also captured (e.g., while the user is leaving the note) and associated with the note. The multi-user note management system can optionally allow an unknown user to leave multiple notes and return to the device, prior to the owner consuming a note, and edit the note (e.g., if the system determines, based on a current captured digital image of the unknown user and the previously captured digital image of the unknown user, that the digital images are of the same user).

When the owner of the device unlocks the device after a note has been left, the multi-user note management system takes different actions based on whether a note was left by the owner of the device, by a known user of the device, or by an unknown user of the device. Notes left by the owner of the device can be accessed via a note taking application of the device. Notes left by a known user of the device are displayed or otherwise presented by the multi-user note management system, optionally along with an identifier of the known user (e.g., a name, a digital image). Notes left by an unknown user of the device are displayed or otherwise presented by the multi-user note management system along with the digital image of the unknown user that was captured when the unknown user left the note. The note can optionally be converted or directed into different actions or items, such as calendar reminders, clock alarms, shopping list items, and so forth.

The techniques discussed herein allow important information to be provided to the owner of a device while maintaining the security of the device. Non-owners of the device can leave notes but full functionality of the device is not made available to non-owners. This maintains security of the device by not disclosing private information stored on the device to non-owners. Furthermore, multiple known users (and optionally unknown users) can leave notes on the device but cannot view, play back, or edit notes left by other users. This maintains security of the device by allowing one user to leave a note for the owner without fear of another user viewing the note.

FIG. 1 illustrates an example computing device 102 implementing the techniques discussed herein. The computing device 102 can be many different types of computing or electronic devices. For example, the computing device 102 can be a smartphone or other wireless phone, a notebook computer (e.g., netbook or ultrabook), a laptop computer, a wearable device (e.g., a smartwatch), a tablet or phablet computer, a personal media player, an Internet of Things (IoT) device, a smart speaker, a smart television, an automotive computer, and so forth.

The computing device 102 includes a display 104, a microphone 106, and a speaker 108. The display 104 can be configured as any suitable type of display, such as an organic light-emitting diode (OLED) display, active matrix OLED display, liquid crystal display (LCD), in-plane shifting LCD, projector, and so forth. The microphone 106 can be configured as any suitable type of microphone incorporating a transducer that converts sound into an electrical signal, such as a dynamic microphone, a condenser microphone, a piezoelectric microphone, and so forth. The speaker 108 can be configured as any suitable type of speaker incorporating a transducer that converts an electrical signal into sound, such as a dynamic loudspeaker using a diaphragm, a piezoelectric speaker, non-diaphragm based speakers, and so forth.

Although illustrated as part of the computing device 102, one or more of the display 104, the microphone 106, and the speaker 108 can be implemented separately from the computing device 102. In such situations, the computing device 102 can communicate with the display 104, the microphone 106, and/or the speaker 108 via any of a variety of wired (e.g., Universal Serial Bus (USB), IEEE 1394, High-Definition Multimedia Interface (HDMI)) or wireless (e.g., Wi-Fi, Bluetooth, infrared (IR)) connections. For example, the display 104 may be separate from the computing device 102 and the computing device 102 (e.g., a streaming media player) communicates with the display 104 via an HDMI cable. By way of another example, the microphone 106 may be separate from the computing device 102 (e.g., the computing device 102 may be a television and the microphone 106 may be implemented in a remote control device) and voice inputs received by the microphone 106 are communicated to the computing device 102 via an IR or radio frequency wireless connection.

The computing device 102 also includes a processor system 110 that includes one or more processors, each of which can include one or more cores. The processor system 110 is coupled with, and may implement functionalities of, any other components or modules of the computing device 102 that are described herein. In one or more embodiments, the processor system 110 includes a single processor having a single core. Alternatively, the processor system 110 includes a single processor having multiple cores or multiple processors (each having one or more cores).

The computing device 102 also includes an operating system 112. The operating system 112 manages hardware, software, and firmware resources in the computing device 102. The operating system 112 manages one or more applications 114 running on the computing device 102, and operates as an interface between applications 114 and hardware components of the computing device 102. Various different types of applications 114 can run on the computing device 102, such as a note taking application as discussed in more detail below.

The computing device 102 also includes one or more sensors 116. A variety of different types of sensors 116 can be included in the computing device 102, such as a thermal sensor, a proximity sensor, an image capture device (e.g., a camera), an active IR sensor, a passive IR sensor, a fingerprint sensor, a motion sensor, and so forth.

In one or more embodiments, the operating system 112 receives data from one or more sensors 116 to determine when a user is approaching the computing device 102 or picks up the computing device 102. This determination can be made in any of a variety of different manners, such as using data from a proximity sensor, data from an IR sensor, and so forth. In response to determining that a user is approaching or picks up the computing device 102, the operating system 112 displays a lock screen. The lock screen refers to a screen that the operating system 112 displays with a limited amount of information on it, and from which a user can be recognized or authenticated. The information displayed on the lock screen can include, for example, one or more of the current time, the current date, a battery charge level, notifications provided by various applications or programs, and so forth.

The computing device 102 also includes a multi-user note management system 118. The multi-user note management system 118 allows one or more users to leave notes on the computing device 102, including the owner, known users, and optionally unknown users. The multi-user note management system 118 can be implemented in a variety of different manners. For example, the multi-user note management system 118 can be implemented as multiple instructions stored on computer-readable storage media and that can be executed by the processor system 110. Additionally or alternatively, the multi-user note management system 118 can be implemented at least in part in hardware (e.g., as an application-specific integrated circuit (ASIC), a field-programmable gate array (FPGA), and so forth).

The computing device 102 also includes a storage device 120. The storage device 120 can be implemented using any of a variety of storage technologies, such as magnetic disk, optical disc, Flash or other solid state memory, and so forth. The storage device 120 can store various program instructions and data for the operating system 112, application 114, or multi-user note management system 118. In one or more embodiments, the multi-user note management system 118 stores notes left on the computing device 102 in the storage 120. These notes can be various digital content as discussed above, such as text or drawings, audio recordings, video recordings, and so forth.

Figure 2:
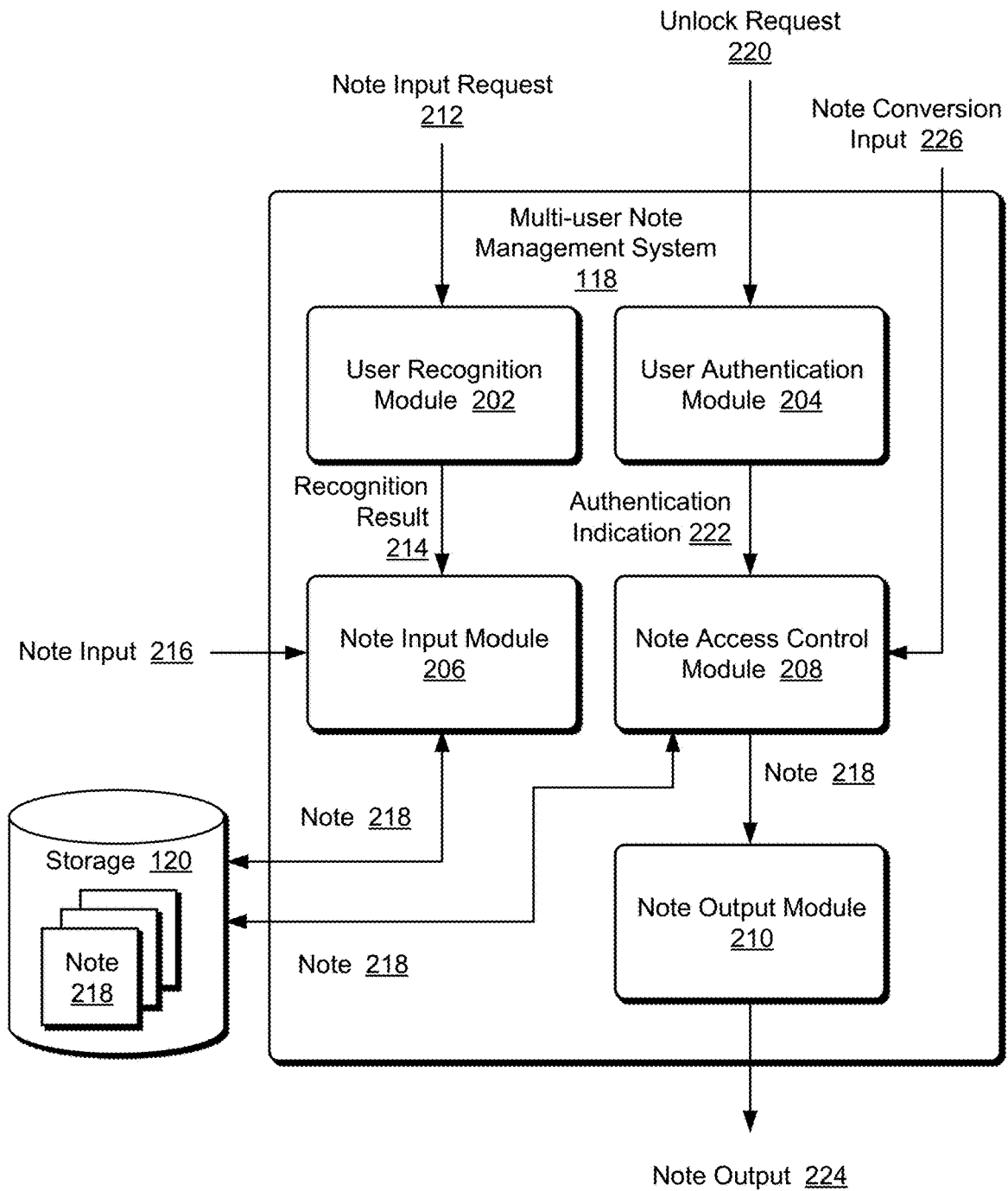
FIG. 2 illustrates an example multi-user note management system in accordance with one or more embodiments.

FIG. 2 illustrates an example multi-user note management system 118 in accordance with one or more embodiments. The multi-user note management system 118 includes a user recognition module 202, a user authentication module 204, a note input module 206, a note access control module 208, and a note output module 210. The computing device 102 implementing the multi-user note management system 118 has an owner, which refers to a primary user of the computing device 102 that can unlock the computing device 102. Unlocking the computing device 102 refers to allowing a user to use his or her account on the computing device 102 and access full functionality of the computing device 102. The computing device 102 also has a set of one or more known users. Known users differ from the owner in that known users cannot unlock the computing device 102. Known users have access to note taking functionality of the computing device 102, but do not have access to full functionality of the computing device 102.

The user recognition module 202 recognizes known users of the computing device 102 as well as the owner of the computing device 102. The user recognition module 202 can recognize known users and the owner using any of a variety of user recognition techniques, such as passwords, personal identification numbers (PINs), fingerprint recognition, face recognition, iris recognition, voice recognition, recognition of other biometric information, and so forth. Similarly, the user authentication module 204 authenticates the owner of the computing device 102. The user authentication module 204 can authenticate the owner using any of a variety of authentication techniques, such as passwords, PINs, fingerprint recognition, face recognition, iris recognition, voice recognition, recognition of other biometric information, and so forth.

Although the user recognition module 202 and the user authentication module 204 can each use any of a variety of different user recognition or authentication techniques, each of the user recognition module 202 and the user authentication module 204 uses a different technique. For example, the user recognition module 202 may use a face recognition technique to recognize known users and the owner, whereas the user authentication module 204 may use a password or PIN to authenticate the owner.

Figure 3:
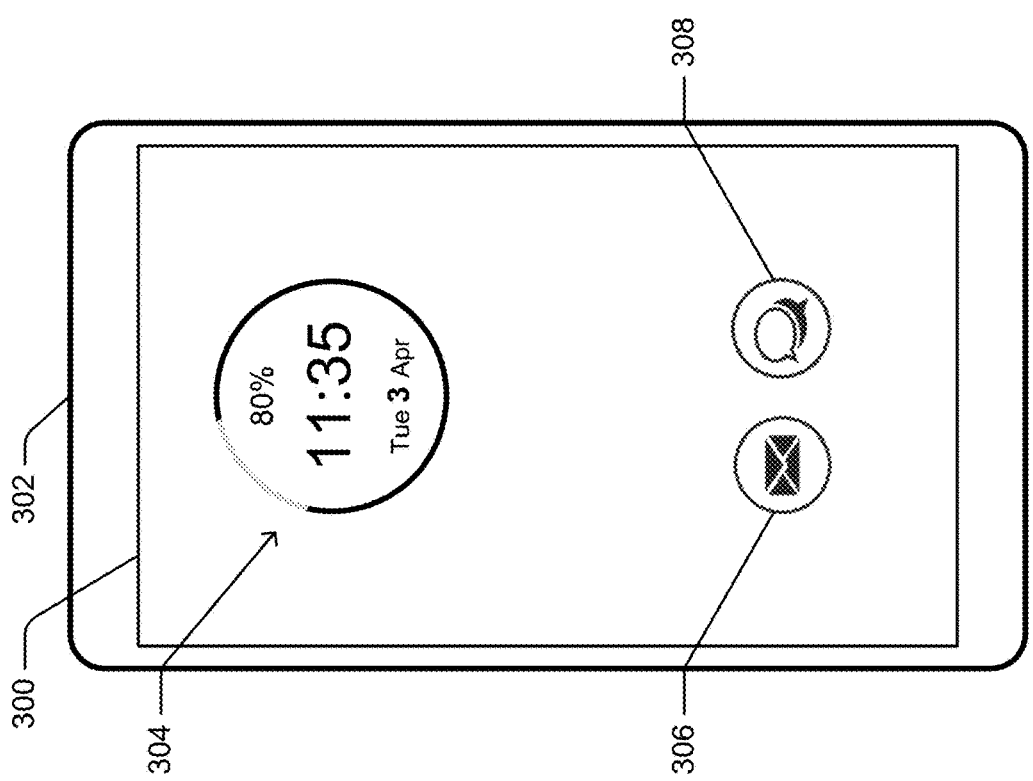
FIG. 3 illustrates an example lock screen displayed by a computing device.

In one or more embodiments, when a user approaches or picks up the computing device 102, a lock screen is displayed as discussed above. FIG. 3 illustrates an example lock screen 300 displayed by a computing device 302. The lock screen 300 includes a status display portion 304, which displays a current time, date, and an indication of battery life remaining. The lock screen 300 also includes selectable items that are a mail icon 306 that is selectable to allow email notifications to be displayed, and a messaging icon 308 that is selectable to allow messaging (e.g., text messaging) notifications to be displayed.

Figure 4:
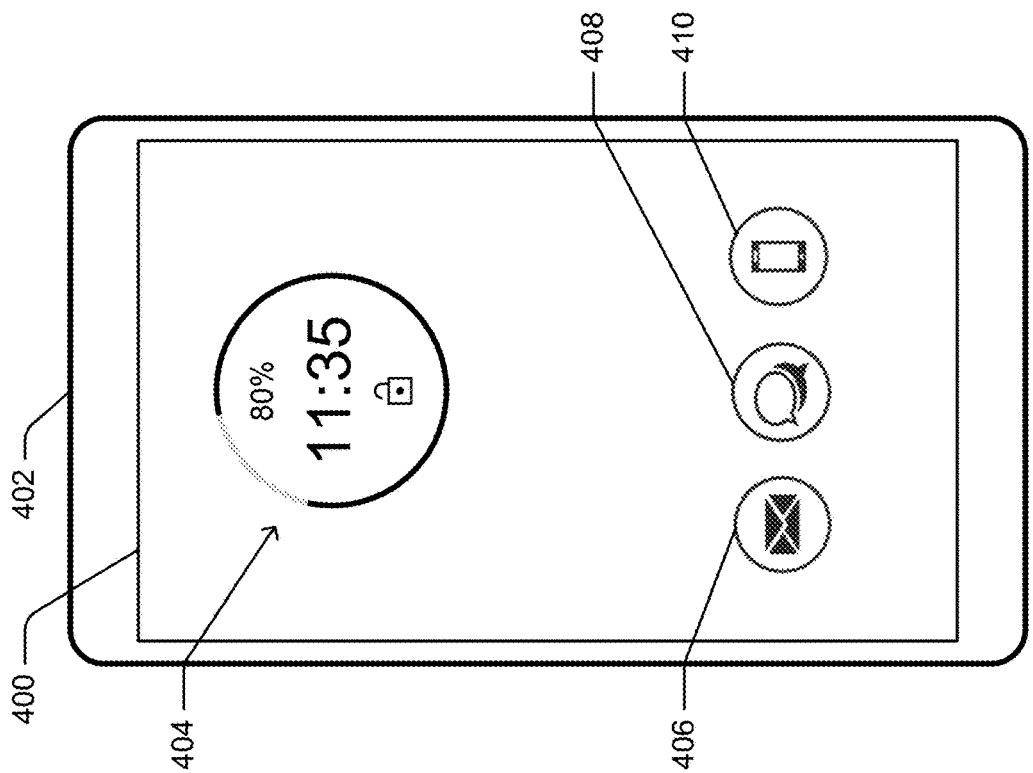
FIG. 4 illustrates another example lock screen displayed by a computing device.

FIG. 4 illustrates another example lock screen 400 displayed by a computing device 402. The lock screen 400 includes a status display portion 404, which displays a current time, date, and an indication of battery life remaining. The lock screen 400 also includes selectable items that are a mail icon 406 that is selectable to allow email notifications to be displayed, a messaging icon 408 that is selectable to allow messaging (e.g., text messaging) notifications to be displayed, and a note taking icon 410 that is selectable to request that a note taking interface be displayed.

Returning to FIG. 2, the user recognition module 202 receives a note input request 212. The note input request 212 is a user request to display a note taking user interface so that the user can leave a note on (input a note to) the multi-user note management system 118. The note input request 212 can be received in any of a variety of different manners. In one or more embodiments, the computing device 102 includes a stylus storage area, such as a slot or hole, in which a stylus can be stored. The stylus can be a passive stylus or an active stylus. Data from various different sensors can be used to determine when the stylus is removed from the stylus storage area. The removal of the stylus from the stylus storage area can be the note input request 212.

Additionally or alternatively, the note input request 212 can be various other actions or events. For example, the note input request 212 can be user selection of an icon on a lock screen, such as user selection of note taking icon 410 of FIG. 4. By way of another example, the note input request 212 can be user activation of a button on an active stylus.

Having the note input request 212 be a particular action or event, such as removal of the stylus from the stylus storage area, activation of a button on an active stylus, or user selection of an icon on a lock screen reduces energy usage at the computing device 102. Energy usage is reduced because certain sensors (e.g., an image capture device) for user recognition module 202 to attempt to recognize a user need not be activated until the user has provided an indication that a note taking interface be displayed.

The user recognition module 202 maintains a record of known users. This record can be maintained, for example, in storage 120. This record is, for each known user, an indication of the user (e.g., name, phone number, picture) as well as recognition data used by the user recognition module 202 to recognize the user. The recognition data can vary based on the user recognition technique used, and can be, for example, a password of the user, facial features of the user, voice features of the user, and so forth.

The user recognition module 202 identifies users and differentiates among the owner, known users, and unknown users. In one or more embodiments, the user recognition module 202 performs this identification and differentiation in response to the note input request 212. The user recognition module 202 provides a recognition result 214 to the note input module 206. The recognition result 214 indicates whether a user of the computing device 102 is the owner, a known user, or an unknown user. In situations where the user is a known user, the recognition result 214 also includes an indication of the user (e.g., name, phone number, picture).

In one or more embodiments there may be multiple people using the computing device 102 concurrently. For example, rather than a single person leaving a note at the computing device 102 multiple people (e.g., a brother and sister) may be together at the computing device 102 and leaving a note. In such situations the user recognition module 202 performs the identification and differentiation for each of the multiple concurrent users. The recognition result 214 indicates, for each of the multiple concurrent users, whether the user is the owner, a known user, or an unknown user. For each concurrent user that is a known user, the recognition result 214 also includes an indication of the user (e.g., name, phone number, picture).

Figure 5:
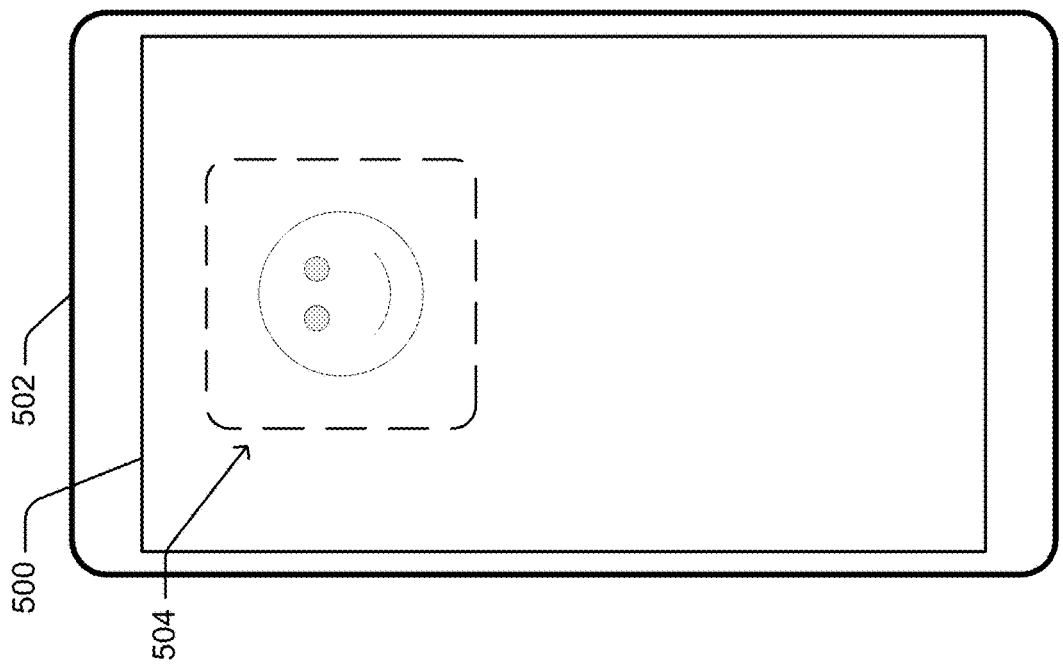
FIG. 5 illustrates an example screen displayed by a computing device when identifying a user.

FIG. 5 illustrates an example screen 500 displayed by a computing device 502 when identifying a user. The lock screen 500 includes a status display portion 504, which displays a face icon indicating that user recognition is being performed.

Returning to FIG. 2, in situations in which the user of the computing device is recognized as a known user, the note input module 206 displays a note taking user interface. The note input module 206 receives note input 216, which can take various forms as discussed above, such as text, other characters, drawings, voice, video, and so forth. The manner in which the user interacts with the computing device 102 to provide the note input 216 can similarly vary. For example, the user can input text, other characters, drawings, and so forth by writing on a touchscreen display 104 of the computing device 102 using a finger or stylus. By way of another example, the user can input a voice note by speaking into the microphone 106, input a video note by looking at an image capture device of the computing device 102 and speaking into the microphone 106, and so forth.

Figure 6:
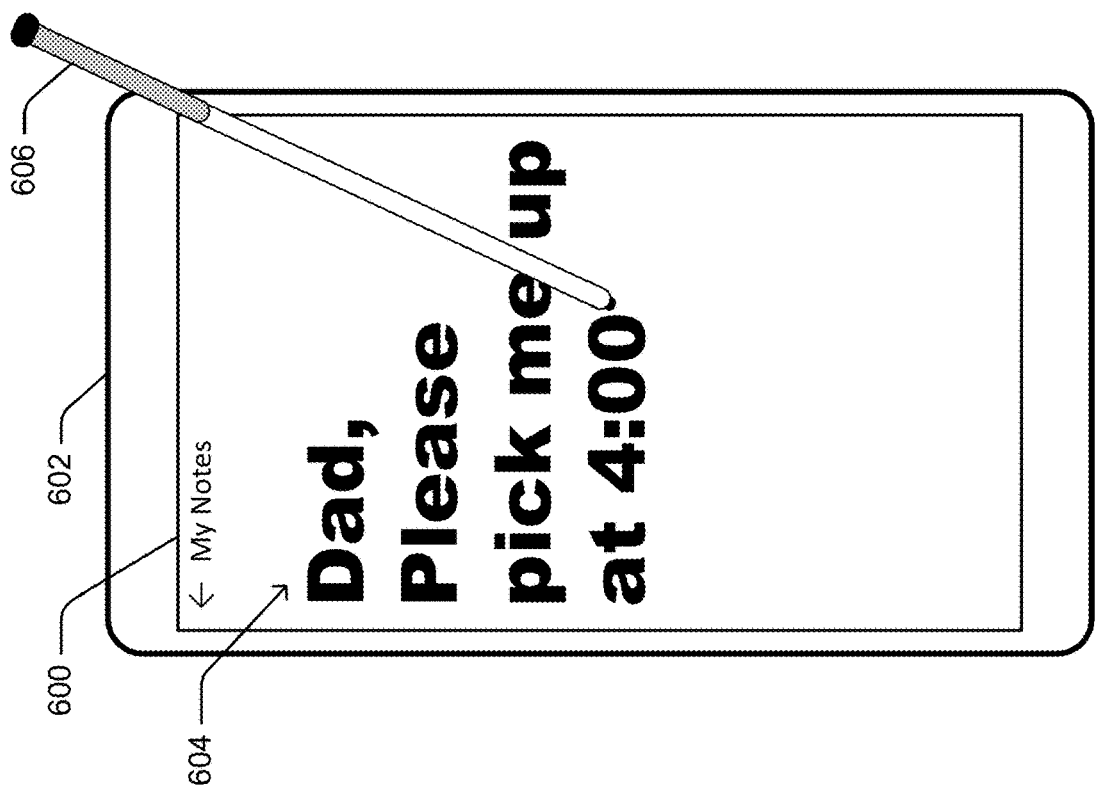
FIG. 6 illustrates an example note taking user interface displayed by a computing device.

FIG. 6 illustrates an example note taking user interface 600 displayed by a computing device 602. The note taking user interface 600 includes a portion or canvas on which a note can be input. In the illustrated example, a note 604 ("Dad, Please pick me up at 4:00") has been left by a user using a stylus 606.

Returning to FIG. 2, the note input module 206 saves the received note input 216 as a note 218 in the storage 120. The indication of the known user (or known users) is also stored in the storage 120 as corresponding to the note 218. The indication of the known user(s) can be stored as corresponding to the note 218 in various manners, such as in a table including the indication and an identifier of the note 218, as metadata of the note 218, and so forth.

In one or more embodiments, the note input module 206 stores the note 218 as a data file in a particular portion of the storage 120 (e.g., a particular folder). This particular portion of the storage 120 is associated with the note input module 206 and the inputting of notes while the computing device 102 is unlocked. The particular portion of the storage 120 where notes 218 left by known users can optionally be changed by user preference settings. The note input module 206 stores or saves the note 218 when the user is finished creating the note 218. The user being finished creating the note 218 can be determined in various manners, such as in response to user input of a "close" or "done" option (e.g., button, menu item, audible command) via the note taking user interface, in response to the user returning the stylus to the stylus storage area, in response to the user deactivating the stylus (e.g., pressing a button on an active stylus), and so forth.

The known user can return to the computing device 102 at a later time to edit the note, delete the note, or create a new note. The user can perform such editing or deleting of the note 218 at any time prior to the note 218 being consumed by the owner of the computing device 102. Consumption of the note 218 refers to the note being displayed or otherwise presented (e.g., played back audibly or visually).

Different known users can leave different notes 218, and the note input module 206 allows a user to view, edit, or delete only those notes 218 that the user created. The note input module 206 prevents users other than the creator of any particular note 218 from accessing the note (e.g., viewing, editing, or deleting the particular note 218).

If the creator of the note 218 returns to access the note, the user recognition module 202 recognizes the known user, the note input module 206 retrieves the note 218 from the storage 120 and displays the note taking interface. This allows the user to edit the content of the note 218, delete the note 218, or leave a new note. Various user interface mechanisms can be used to edit the content of the note 218, delete the note 218, or indicate that a new note is to be created. These user interface mechanisms can be, for example, selection of displayed buttons or menu items, touchscreen gestures, audible commands, and so forth.

Situations can arise in which a collection of multiple known users are concurrently using the computing device 102 as discussed above. In such situations, the note input module 206 receives an indication of each of the known users as part of the recognition result 214. The note input module 206 stores the note 218 as a data file in a particular portion of the storage 120 (e.g., a particular folder) as discussed above but associated with the indications of each of the known users. For a note associated with a collection of multiple known users, the note input module 206 allows a collection of users to later view, edit, or delete the note only if that collection of users is the same collection of multiple known users that created the note.

In situations in which the user of the computing device is recognized as the owner, the note input module 206 operates analogously to the situation in which the user of the computing device is recognized as a known user. In one or more embodiments, one exception to this analogous operation is the location where the received note input 216 is stored as a note 218. In such embodiments, the note input module 206 stores notes 218 left by the owner in an owner storage location that is different than the notes 218 left by known users (e.g., a different folder). For example, the note input module 206 stores notes 218 left by the owner in a folder corresponding to a note taking application or as an image in a folder corresponding to an image viewing application. By way of another example, the note input module 206 stores notes 218 left by the owner as pinned to the lock screen. The location where notes 218 left by the owner are stored can optionally be changed by user preference settings.

In one or more embodiments, in situations in which the user of the computing device is recognized as an unknown user, the note input module 206 does not display the note taking interface and no note input is received. Accordingly, the multi-user note management system 118 does not allow notes to be left at the computing device 102 for unknown users.

Additionally or alternatively, in situations in which the user of the computing device is recognized as an unknown user, the note input module 206 operates analogously to the situation in which the user of the computing device is recognized as a known user except that the identity of the user is not known. Accordingly, the multi-user note management system 118 communicates with an image capture device of the computing device 102 to capture an image of the unknown user(s). The note input module 206, rather than saving an indication of a known user in the storage 120 as corresponding to the note 218, stores the captured image of the unknown user(s) in the storage 120 as corresponding to the note 218. The captured image of the unknown user(s) can be stored as corresponding to the note 218 in various manners, such as in a table or other record including the captured image and an identifier of the note 218, as metadata of the note 218, and so forth.

The unknown user can return to the computing device 102 at a later time to edit the note, delete the note, or create a new note. The user can perform such editing or deleting of the note 218 at any time prior to the note 218 being consumed by the owner of the computing device 102. Consumption of the note 218 refers to the note being displayed or otherwise presented (e.g., played back audibly or visually) by the owner.

Different unknown users can leave different notes 218, and the note input module 206 allows a user to view, edit, or delete only those notes 218 that the user created. The note input module 206 prevents users other than the creator of any particular note 218 from accessing the note (e.g., viewing, editing, or deleting the particular note 218).

If the creator of the note 218 returns to access the note, the multi-user note management system 118 captures an image of the user (referred to as the currently captured image) and the note input module 206 compares the currently captured image to the stored captured images associated with the stored notes 218. If the currently captured image of the matches a stored captured image (e.g., the faces of the users are the same) then the note input module 206 retrieves the note 218 associated with the stored captured image from the storage 120 and displays the note taking interface. This allows the user to edit the content of the note 218, delete the note 218, or leave a new note. The currently captured image and a stored captured image can be compared using various public or proprietary techniques, such as comparing facial features or iris features of the unknown user in the currently captured image to the facial features or iris features of the unknown user in the stored captured image.

Situations can arise in which a collection of multiple unknown users are concurrently using the computing device 102 as discussed above. In such situations, the captured image includes each of the unknown users. The note input module 206 stores the note 218 as a data file in a particular portion of the storage 120 (e.g., a particular folder) as discussed above associated with the captured imaged. For a note associated with a collection of multiple unknown users, the note input module 206 allows a collection of unknown users to later view, edit, or delete the note only if that collection of unknown users in the currently captured image is the same collection of multiple known users in the stored captured image.

Situations can arise in which a collection of multiple users from groupings of known users, unknown users, and the owner are concurrently using the computing device 102. For example, a known user and an unknown user can be using the computing device 102 concurrently. By way of another example, a known user and the owner can be using the computing device 102 concurrently.

In one or more embodiments, in such situations the note input module 206 operates as discussed above for any one of the known users, unknown users, and owner, or as discussed above for those users in the collection of multiple users. For example, if the collection of multiple users includes the owner then the note input module 206 operates as discussed above for the owner regardless of whether a known user or an unknown user is concurrently using the computing device 102 with the owner. By way of another example, if the collection of multiple users does not include the owner but includes both known users and unknown users then the note input module 206 operates as discussed above with the indication of the known user(s) and the captured image of the collection of multiple users. E.g., for a note associated with a collection of at least one known user and at least one unknown user, the note input module 206 allows a collection of multiple users to later view, edit, or delete the note only if the unknown users in the currently captured image is the same as the unknown users in the stored captured image, and if known users are the same known users that created the note.

Eventually, the user authentication module 204 receives an unlock request 220 from the owner of the computing device 102. The unlock request 220 includes authentication information for the owner. The user authentication module 204 can authenticate the owner using any of a variety of authentication techniques, such as passwords, PINs, fingerprint recognition, face recognition, iris recognition, voice recognition, recognition of other biometric information, and so forth as discussed above.

The user authentication module 204 provides an authentication indication 222 to the note access control module 208 indicating whether the owner was authenticated in response to the unlock request 220. In response to the authentication indication 222 indicating that the owner was authenticated, the note access control module 208 obtains the notes 218 from the storage 120. In one or more embodiments, the note access control module 208 obtains all of the notes 218 that have not been consumed yet by the owner from the storage 120. Additionally or alternatively, the note access control module 208 obtains a subset of the notes 218 that have not yet been consumed by the owner from the storage 120, such as only the notes 218 left by a known user(s) or an unknown user(s).

The note access control module 208 provides the notes 218 to threshold amount note output module 210, which in turn outputs the notes 218 as note output 224. Outputting the notes refers to displays, plays back, or otherwise presents the notes 218 as note output 224. The notes can be output in a variety of different manners. In one or more embodiments, a list of the notes is displayed or otherwise presented (e.g., a list of titles or first few words of each) and the owner can select which note(s) he or she desires to consume. Additionally or alternatively, a list of users who left notes can be displayed or otherwise presented and the owner can select which note(s) he or she desires to consume. Additionally or alternatively, the notes can be displayed or otherwise presented one by one in some order (e.g., chronologically, notes from known users followed by notes from unknown users, based on the particular user (e.g., have notes from a list of favorites displayed before other notes)) and the owner can provide various users inputs to scroll through the notes.

Figure 7:
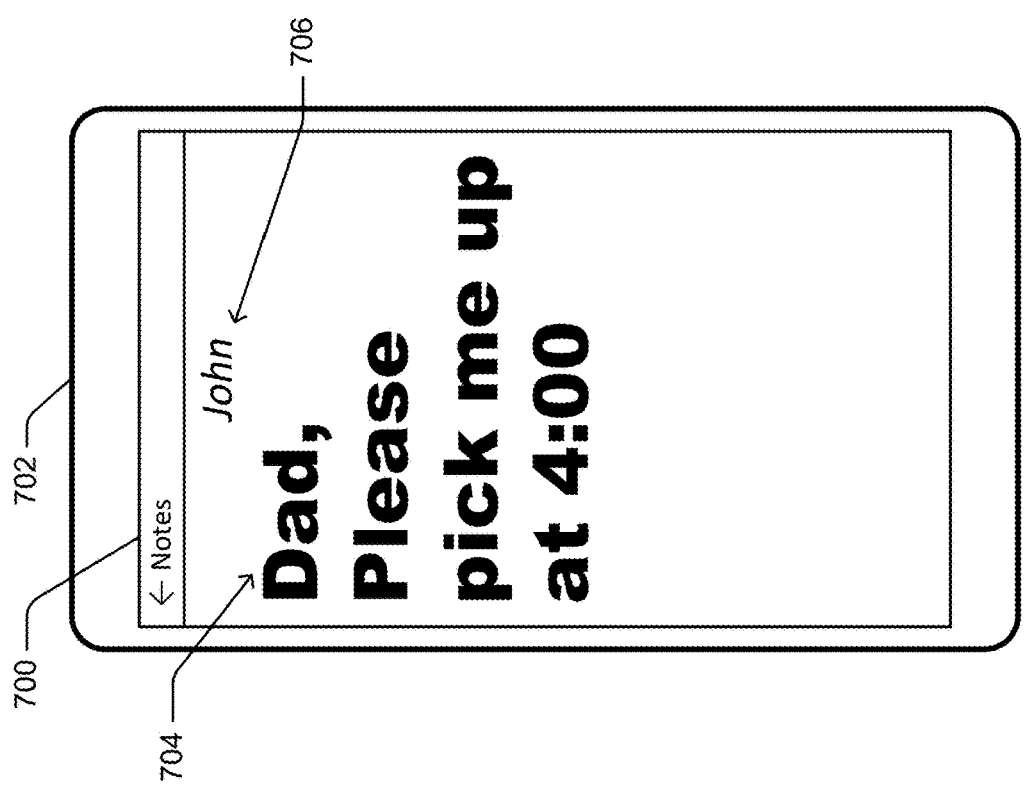
FIG. 7 illustrates an example note output user interface displayed by a computing device.

FIG. 7 illustrates an example note output user interface 700 displayed by a computing device 702. The note output user interface 700 displays a note 704 ("Dad, Please pick me up at 4:00"). The note 704 has been left by a known user and an identifier 706 of the known user ("John") is also displayed as part of the note output user interface 700.

Figure 8:
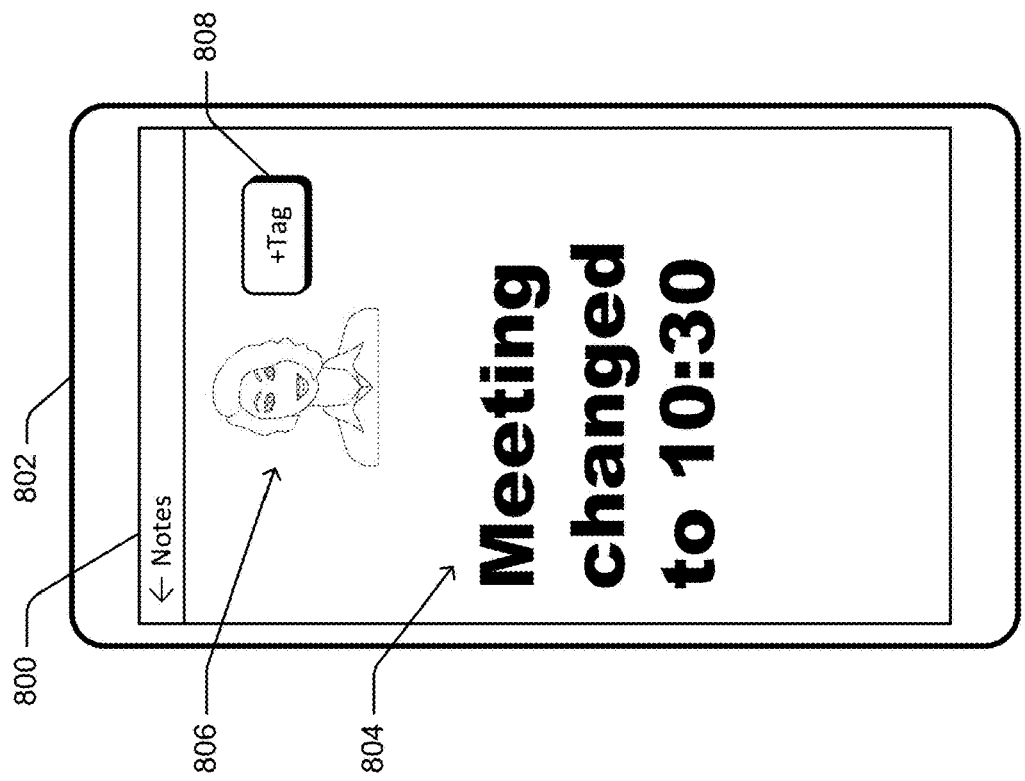
FIG. 8 illustrates another example note output user interface displayed by a computing device.

FIG. 8 illustrates another example note output user interface 800 displayed by a computing device 802. The note output user interface 800 displays a note 804 ("Meeting changed to 10:30"). The note 804 has been left by an unknown user and a captured image 806 of the unknown user is also displayed as part of the note output user interface 800.

The note output user interface 800 optionally displays a tag option 808 in the form of a user selectable button. Selection of the tag option 808 allows the owner to input an indication of the person in the captured image (e.g., a name of the person). The user recognition module 202 can then analyze the captured image 806 (e.g., identifying facial features, identifying iris features) and maintain those features as associated with the input indication of the person, allowing the person to become a known user.

Returning to FIG. 2, in one or more embodiments a note is referred to as being consumed in response to being displayed, played back, or otherwise presented at the computing device 102. Once consumed, the note may be maintained, or alternatively may be deleted as soon as the owner switches to viewing a different note. Notes optionally have an associated delete option (e.g., a button, a touchscreen gesture) and are maintained until user selection of the delete option is received.

In one or more embodiments, the note access control module 208 has the notes output via the note output module 210 in response to the receipt of the unlock request 220. Accordingly, the notes are displayed as soon as the owner unlocks the computing device 102, giving the owner an immediate indication of the notes so that he or she is immediately aware of them. Additionally or alternatively, the notes can be displayed at other times, such as in response to a user input (e.g., selection of a button, a touchscreen gesture) requesting that notes be displayed.

In one or more embodiments, a note 218 can be converted into a context specific action. A context specific action refers to an action that is performed with the note based on the specific context of the note. The context of a note 218 can be determined in various manners. For example, the context can be determined automatically by the note access control module 208 by analyzing the content of the note (e.g., if the note includes a time then the note can be determined to be a reminder, if the note includes a series of products or items then the note can be determined to be a list). By way of another example, the context can be determined based on user input (e.g., user selection of an "add to calendar" option indicates the context of the note is reminder, user selection of an "add to shopping list" option indicates the context of the note is a list).

In one or more embodiments, a note 218 is converted into a context specific action in response to a note conversion user input 226 indicating to perform a particular action with the note 218. This user input can be received in any of a variety of different manners, such as selection of a button or menu item, audible input, touchscreen gesture, and so forth. In response to the user input, a corresponding application is launched (if not already launched) and the content of the note is added to an entry for the application. For example, if the user selects an "add to calendar" option then a calendaring application is launched and a calendar entry is created with the note being the content of the calendar entry. By way of another example, if the user selects an "add reminder" option then an alarm application is launched and an alarm is created with the note being the content of the alarm. The owner can then use the launched application to further edit the entry (e.g., set additional calendar entry parameters, set additional alarm parameters, and so forth).

Figure 9:
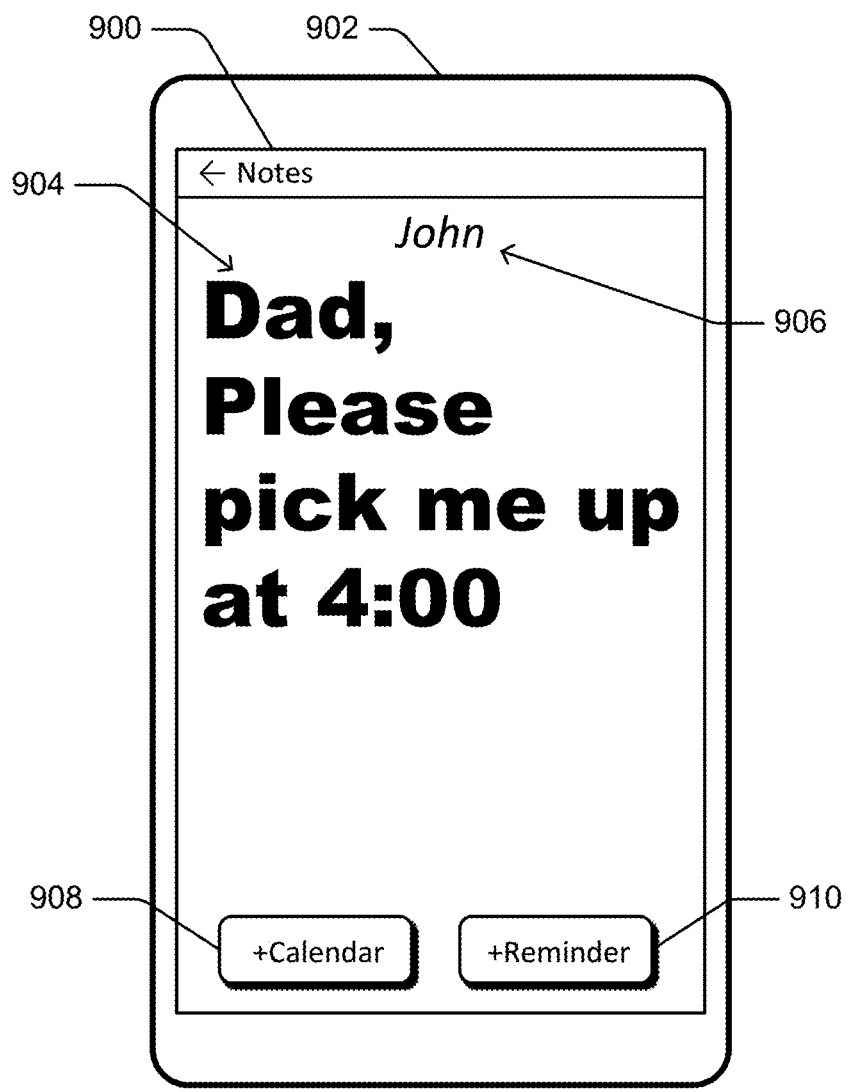
FIG. 9 illustrates another example note output user interface displayed by a computing device.

FIG. 9 illustrates an example note output user interface 900 displayed by a computing device 902. The note output user interface 900 displays a note 904 ("Dad, Please pick me up at 4:00") and an identifier 906 of the known user ("John") that left the note. An add calendar option 908 and an add reminder option 910 are also displayed. In response to user selection of the add calendar option 908, a calendar application is launched and a calendar entry is created with the note 904 being the content of the calendar entry. The note access control module 208 (or the calendar application) can automatically detect the time (4:00) and set the time for the calendar entry to 4:00. In response to user selection of the add reminder option 910, an alarm application is launched and an alarm entry is created with the note 904 being the content of the alarm entry (e.g., a title or name of an alarm). The note access control module 208 (or the alarm application) can automatically detect the time (4:00) and set the time for the alarm entry to 4:00.

Returning to FIG. 2, the computing device 102 can optionally operate in multiple different power modes, including at least a low power mode and a higher power mode. Various different power conserving techniques can be used in the low power mode, such as activating or powering only a portion of the display 104 to be able to display data (e.g., only the area on the display 104 where a status or selectable items are displayed), deactivating or powering down certain processors or processor cores, deactivating or powering down certain sensors 116, and so forth. In the higher power mode, one or more of these power conserving techniques are reversed (e.g., the entire display 104 is activated or powered on, processors or processor cores are activated or powered on, certain sensors 116 are activated or powered on, and so forth).

In one or more embodiments, the computing device 102 remains in the low power mode until the user recognition module 202 performs its identification and differentiation, or until the user authentication module 204 authenticates the owner. This allows the computing device 102 to remain in the low power mode while recognizing or authenticating users, and then transition to a higher power mode to receive, display, or otherwise present notes.

Figure 10A:
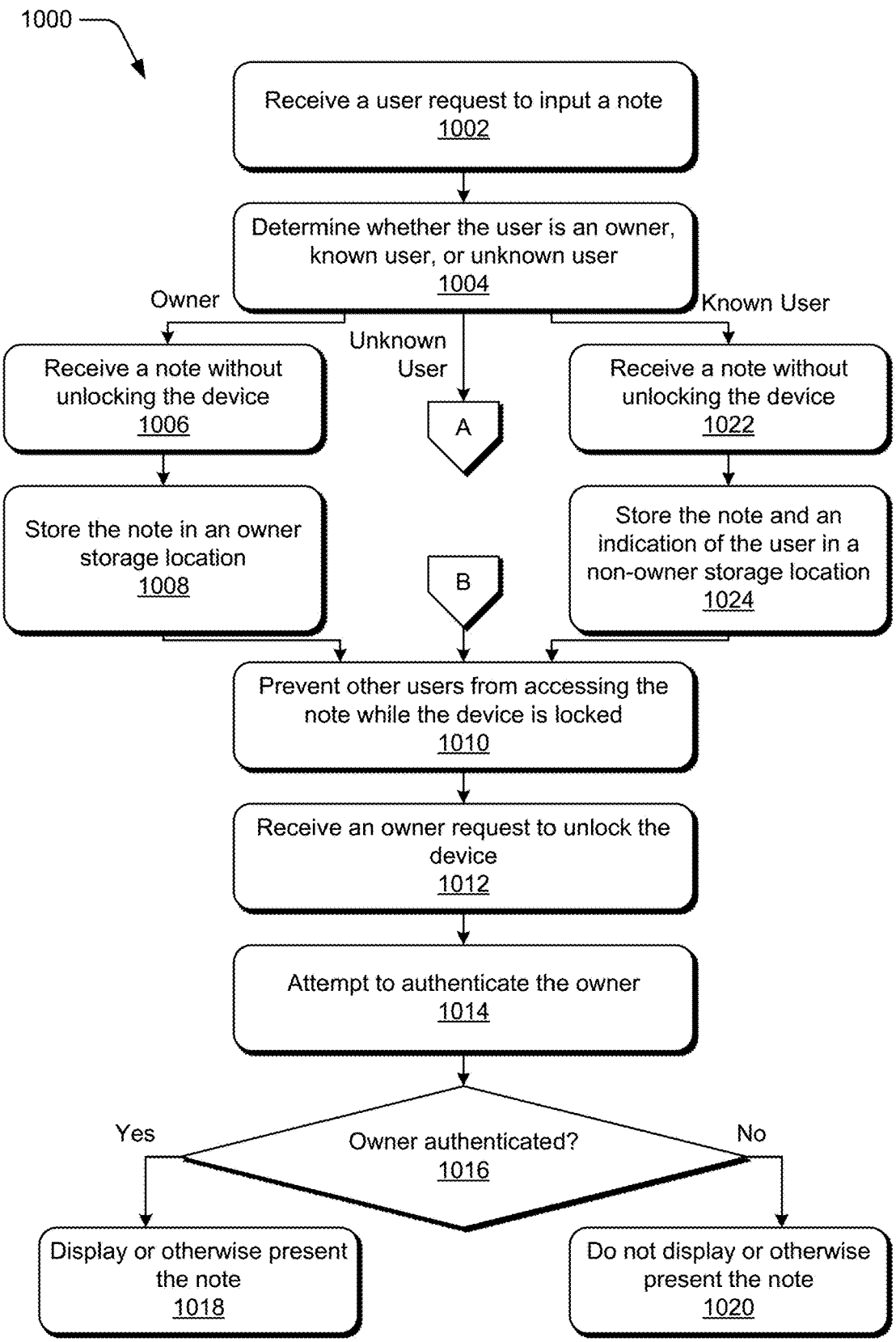
FIGS. 10A and 10B illustrate an example process for implementing the techniques discussed herein in accordance with one or more embodiments.
Figure 10B:
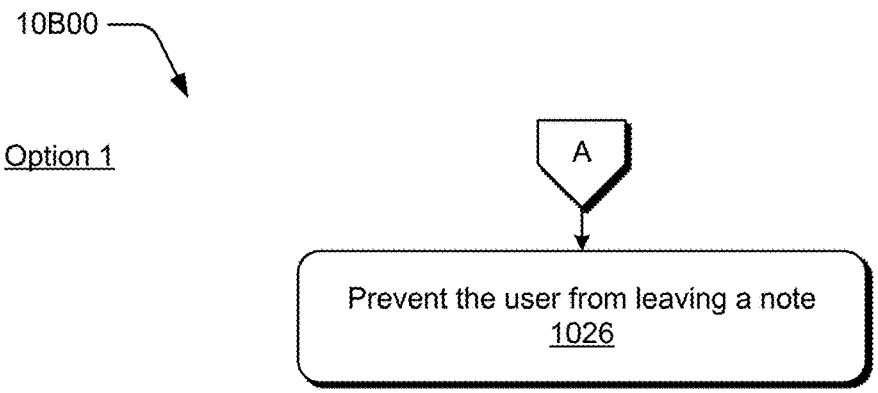
Figure 10B:
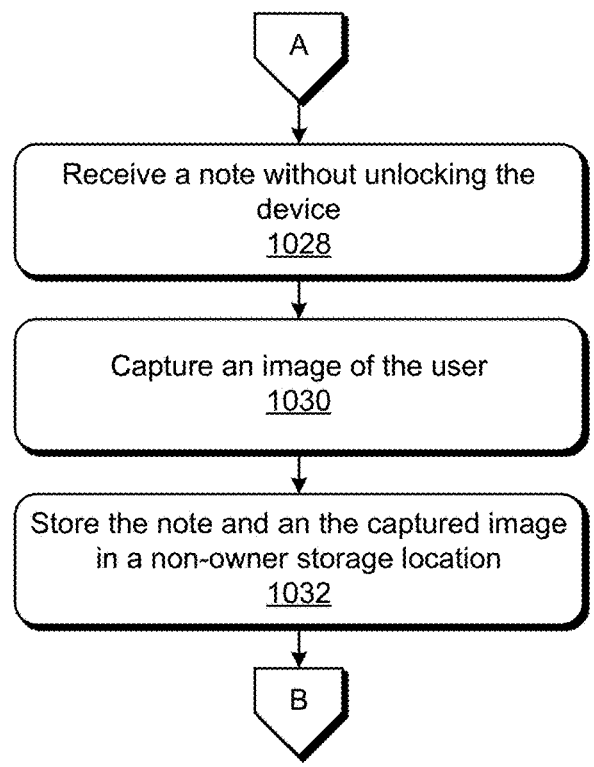

FIGS. 10A and 10B illustrate an example process 1000 for implementing the techniques discussed herein in accordance with one or more embodiments. Process 1000 is carried out by a multi-user note management system, such as the multi-user note management system 118 of FIG. 1 or FIG. 2, and can be implemented in software, firmware, hardware, or combinations thereof. The multi-user note management system is implemented at least in part on a device. Process 1000 is shown as a set of acts and is not limited to the order shown for performing the operations of the various acts.

A user request to input a note is received (act 1002). This user request can take various forms as discussed above, such as removal of a stylus from a stylus storage area of the device, selection of an icon, and so forth.

In response to the user request a determination is made as to whether the user is an owner of the device, a known user of the device, or an unknown user (act 1004). The process differentiates among the owner, known users, and unknown users, and can take different actions depending on whether the user is the owner, a known user, or an unknown user.

In response to determining that the user is the owner of the device, a note is received without unlocking the device (act 1006). The note can be received in various manners, such as touchscreen inputs, audible inputs, video inputs, and so forth.

The note is stored in an owner storage location (act 1008). The owner storage location can be, for example, a folder corresponding to a note taking application, or a folder corresponding to an image viewing application, or a lock screen of the device.

Other users are prevented from accessing the note while the device is locked (act 1010). However, an owner request to unlock the device can be received (act 1012), and in response to the unlock request an attempt is made to authenticate the owner (act 1014).

Process 100 proceeds based on whether the owner is authentication (act 1016). If the user is authenticated, the notes previously left on the device are displayed or otherwise presented (act 1018). However, if the user is not authenticated, the notes previously left on the device are not displayed or otherwise presented (act 1020).

Returning to act 1004, in response to determining that the user is a known user of the device, a note is received without unlocking the device (act 1022). The note can be received in various manners, such as touchscreen inputs, audible inputs, video inputs, and so forth.

The note and an indication of the known user is stored in a non-owner storage location (act 1024). This indication can be displayed or otherwise presented to the owner when the note is subsequently displayed or otherwise presented to the owner in act 1018. The non-owner storage location can be, for example, a different folder than the folder in which notes from the owner are stored. Process 1000 then proceeds to prevent other users from accessing the note while the device is locked (act 1010).

Returning to act 1004, in response to determining that the user is an unknown user of the device, one of two different actions is taken. Which action is taken can be determined in various manners, such as by the designer or developer of the multi-user note management system, by the owner of the device (e.g., based on a preference or configuration setting), and so forth.

In one or more embodiments, the user is prevented from leaving a note (act 1026 of FIG. 10B). Accordingly, unknown users are not able to leave notes.

In one or more other embodiments, in response to determining that the user is an unknown user of the device, a note is received without unlocking the device (act 1028). The note can be received in various manners, such as touch-screen inputs, audible inputs, video inputs, and so forth.

A digital image of the unknown user is also captured (act 1030). This digital image can be, for example, a digital image that was captured in order to determine whether the user is the owner, a known user, or an unknown user in act 1004.

The note as well as the captured image is stored in a non-owner storage location (act 1032). This captured image can be displayed to the owner when the note is subsequently displayed or otherwise presented to the owner in act 1018 of FIG. 10A. The non-owner storage location can be, for example, a different folder than the folder in which notes from the owner are stored. Process 1000 then proceeds to prevent other users from accessing the note while the device is locked (act 1010 of FIG. 10A).

Figure 11:
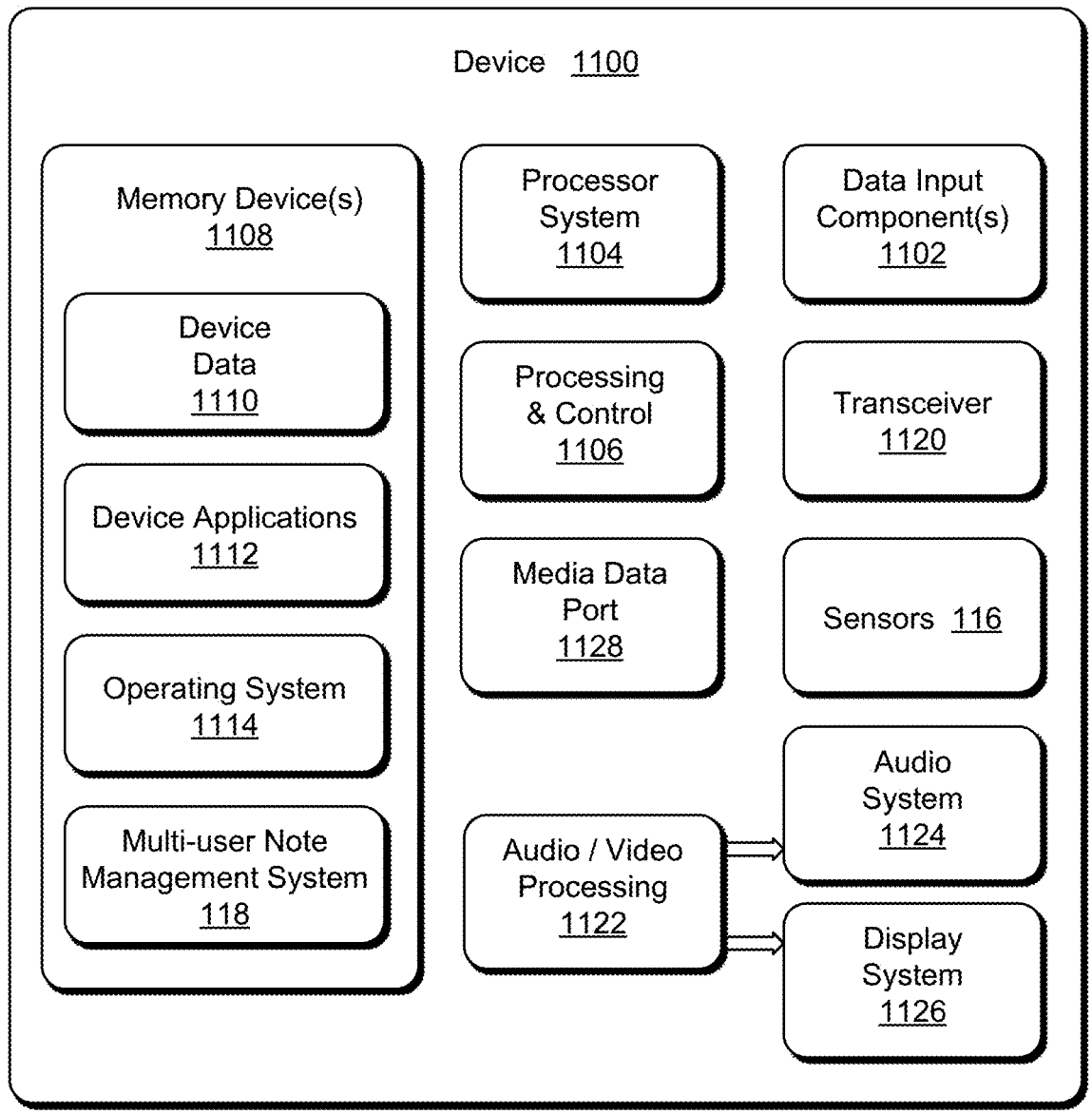
FIG. 11 illustrates various components of an example electronic device that can implement embodiments of the techniques discussed herein.

FIG. 11 illustrates various components of an example electronic device 1100 that can be implemented as a computing device as described with reference to any of the previous FIGS. 1-10. The device 1100 may be implemented as any one or combination of a fixed or mobile device in any form of a consumer, computer, portable, user, communication, phone, navigation, gaming, messaging, Web browsing, paging, media playback, or other type of electronic device.

The electronic device 1100 can include one or more data input components 1102 via which any type of data, media content, or inputs can be received such as user-selectable inputs, messages, music, television content, recorded video content, and any other type of audio, video, or image data received from any content or data source. The data input components 1102 may include various data input ports such as universal serial bus ports, coaxial cable ports, and other serial or parallel connectors (including internal connectors) for flash memory, DVDs, compact discs, and the like. These data input ports may be used to couple the electronic device to components, peripherals, or accessories such as keyboards, microphones, or cameras. The data input components 1102 may also include various other input components such as microphones, touch sensors, keyboards, and so forth.

The electronic device 1100 of this example includes a processor system 1104 (e.g., any of microprocessors, controllers, and the like) or a processor and memory system (e.g., implemented in a system on a chip), which processes computer executable instructions to control operation of the device 1100. A processor system 1104 may be implemented at least partially in hardware that can include components of an integrated circuit or on-chip system, an application specific integrated circuit, a field programmable gate array, a complex programmable logic device, and other implementations in silicon or other hardware. Alternatively or in addition, the electronic device 1100 can be implemented with any one or combination of software, hardware, firmware, or fixed logic circuitry implemented in connection with processing and control circuits that are generally identified at 1106. Although not shown, the electronic device 1100 can include a system bus or data transfer system that couples the various components within the device 1100. A system bus can include any one or combination of different bus structures such as a memory bus or memory controller, a peripheral bus, a universal serial bus, or a processor or local bus that utilizes any of a variety of bus architectures.

The electronic device 1100 also includes one or more memory devices 1108 that enable data storage such as random access memory, nonvolatile memory (e.g., read only memory, flash memory, erasable programmable read only memory, electrically erasable programmable read only memory, etc.), and a disk storage device. A memory device 1108 provides data storage mechanisms to store the device data 1110, other types of information or data (e.g., data backed up from other devices), and various device applications 1112 (e.g., software applications). For example, an operating system 1114 can be maintained as software instructions with a memory device and executed by the processor system 1104.

In one or more embodiments the electronic device 1100 includes a multi-user note management system 118 and one or more sensors 116, described above. Although represented as a software implementation, the multi-user note management system 118 may be implemented as any form of a multi-user note management application, module, firmware that is installed on the device 1100, a hardware implementation of the modules, and so on. Various aspects of the techniques discussed herein can also be offloaded to one or more additional devices, such as a service accessed over the Internet or other network.

Moreover, in one or more embodiments the techniques discussed herein can be implemented as a computer-readable storage medium having computer readable code stored thereon for programming a computing device (for example, a processor of a computing device) to perform a method as discussed herein. Computer-readable storage media refers to media and/or devices that enable persistent and/or non-transitory storage of information in contrast to mere signal transmission, carrier waves, or signals per se. Computer-readable storage media refers to non-signal bearing media. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. The computer-readable storage medium can be, for example, memory devices 1108.

The electronic device 1100 also includes a transceiver 1120 that supports wireless and/or wired communication with other devices or services allowing data and control information to be sent as well as received by the device 1100. The wireless and/or wired communication can be supported using any of a variety of different public or proprietary communication networks or protocols such as cellular networks (e.g., third generation networks, fourth generation networks such as LTE networks), wireless local area networks such as Wi-Fi networks, and so forth.

The electronic device 1100 can also include an audio or video processing system 1122 that processes audio data or passes through the audio and video data to an audio system 1124 or to a display system 1126. The audio system or the display system may include any devices that process, display, or otherwise render audio, video, display, or image data. Display data and audio signals can be communicated to an audio component or to a display component via a radio frequency link, S-video link, high definition multimedia interface (HDMI), composite video link, component video link, digital video interface, analog audio connection, or other similar communication link, such as media data port 1128. In implementations the audio system or the display system are external components to the electronic device. Alternatively or in addition, the display system can be an integrated component of the example electronic device, such as part of an integrated touch interface.

Although embodiments of techniques for implementing note taking at a device based on whether the user is a known user, unknown user, or owner have been described in language specific to features or methods, the subject of the appended claims is not necessarily limited to the specific features or methods described. Rather, the specific features and methods are disclosed as example implementations of techniques for implementing note taking at a device based on whether the user is a known user, unknown user, or owner, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

A method comprising: receiving, by a computing device, a first user request to input a note to the computing device; determining, in response to the first user request, whether the user is an owner of the computing device, a known user of the computing device, or an unknown user; receiving at the computing device, without unlocking the computing device and in response to determining that the user is the owner of the computing device or a known user of the computing device, the note; storing the note; preventing, while the computing device is locked, other users of the computing device from accessing the note; receiving an owner request to unlock the computing device; authenticating the owner; and presenting, in response to the owner request and authenticating the owner, the note.

Alternatively or in addition to the above described method, any one or combination of the following. The receiving the note comprising receiving user input to a touchscreen of the computing device. The receiving the first user request to input the note comprising detecting that a stylus has been removed from a stylus storage area of the computing device. The method further comprising preventing the user from leaving a note in response to determining that the user is an unknown user. The method further comprising, in response to determining that the user is an unknown user: receiving at the computing device, without unlocking the computing device, the note; capturing a digital image of the unknown user; and storing the note and the digital image of the unknown user. The presenting the note including displaying the digital image of the unknown user. The method further comprising recognizing an identity of the known user, and the storing including storing an identifier of the known user. The presenting the note including displaying the identifier of the known user. The method further comprising: receiving owner input to convert the note into a context specific action; and converting, in response to the owner input, the note into the context specific action. The method further comprising: receiving, after receiving the note but prior to presenting the note in response to the owner request, a second user request to input a note to the computing device; determining whether both the first user request and the second user request are received from the same user; and receiving an edit to the note only in response to the first user request and the second user request being received from the same user. The user being one of a collection of multiple users using the computing device concurrently, the method further comprising: recognizing an identity of each user in the collection of users, and the storing including storing an identifier of each user in the collection of users; receiving, after receiving the note but prior to presenting the note in response to the owner request, a second user request to input a note to the computing device; determining whether both the first user request and the second user request are received from the same collection of users; and receiving an edit to the note only in response to the first user request and the second user request being received from the same collection of users.

A computing device comprising: a processor; and a computer-readable storage medium having stored thereon multiple instructions that, responsive to execution by the processor, cause the processor to perform acts including: receiving a user request to input a note to the computing device; determining, in response to the first user request, whether the user is a known user of the computing device or an unknown user of the computing device; receiving at the computing device, without unlocking the computing device and in response to determining that the user is a known user of the computing device, the note; storing the note; preventing, while the computing device is locked, other users of the computing device from accessing the note; receiving an owner request to unlock the computing device; authenticating the owner; and presenting, in response to the owner request and authenticating the owner, the note.

Alternatively or in addition to the above described computing device, any one or combination of the following. The acts further comprising preventing the user from leaving a note in response to determining that the user is an unknown user. The acts further comprising, in response to determining that the user is an unknown user: receiving at the computing device, without unlocking the computing device, the note; capturing a digital image of the unknown user; and storing the note and the digital image of the unknown user. The presenting the note including displaying the digital image of the unknown user.

A system comprising: a note input module, implemented at least in part in hardware, to receive a first user request to input a note; a user recognition module, implemented at least in part in hardware, to determine, in response to the first user request, whether the user is an owner of a computing device, a known user of the computing device, or an unknown user; the note input module being further to receive and store, without unlocking the computing device, the note in response to the user being the owner of the computing device or a known user of the computing device; a note access control module, implemented at least in part in hardware, to prevent, while the computing device is locked, other users of the computing device from accessing the note; a user authentication module, implemented at least in part in hardware, to receive an owner request to unlock the computing device and to authenticate the owner; and a note output module, implemented at least in part in hardware, to present, in response to authenticating the owner, the note at the computing device.

Alternatively or in addition to the above described system, any one or combination of the following. The computing device including a stylus storage area, and wherein the note input module is to receive, as the first user request, an indication that a stylus has been removed from the stylus storage area. Wherein the note access control module is further to prevent the user from leaving a note in response to determining that the user is an unknown user. Wherein the note access control module is further to, in response to determining that the user is an unknown user: receive at the computing device, without unlocking the computing device, the note; capture a digital image of the unknown user; and store the note and the digital image of the unknown user. Wherein the note access control module is further to: receive owner input to convert the note into a context specific action; and convert, in response to the owner input, the note into the context specific action.

What is claimed is:

1. A method comprising:
   receiving, by a computing device, a first user request to input a note to the computing device;
   determining, in response to the first user request, whether the user is an owner of the computing device, a known user of the computing device, or an unknown user;
   receiving at the computing device, without unlocking the computing device and in response to determining that the user is the owner of the computing device or a known user of the computing device, the note;
   storing the note;
   preventing, while the computing device is locked, other users of the computing device from accessing the note;
   receiving, by the computing device, a second user request to edit the note;
   receiving an edit to the note only in response to determining that both the first user request and the second user request are received from a same user;
   receiving an owner request to unlock the computing device;
   authenticating the owner; and
   presenting, in response to the owner request and authenticating the owner, the note.

2. The method as recited in claim 1, the receiving the note comprising receiving user input to a touchscreen of the computing device.

3. The method as recited in claim 2, the receiving the first user request to input the note comprising detecting that a stylus has been removed from a stylus storage area of the computing device.

4. The method as recited in claim 1, further comprising preventing the user from leaving a note in response to determining that the user is an unknown user.

5. The method as recited in claim 1, further comprising, in response to determining that the user is an unknown user:
   receiving at the computing device, without unlocking the computing device, the note;
   capturing a digital image of the unknown user; and
   storing the note and the digital image of the unknown user.

6. The method as recited in claim 5, the presenting the note including displaying the digital image of the unknown user.

7. The method as recited in claim 1, further comprising recognizing an identity of the known user, and the storing including storing an identifier of the known user.

8. The method as recited in claim 7, the presenting the note including displaying the identifier of the known user.

9. The method as recited in claim 1, further comprising:
   receiving owner input to convert the note into a context specific action; and
   converting, in response to the owner input, the note into the context specific action.

10. The method as recited in claim 1, wherein the second user request is received after receiving the note but prior to presenting the note in response to the owner request.

11. A computing device comprising:
    a processor; and
    a non-transitory computer-readable storage medium having stored thereon multiple instructions that, responsive to execution by the processor, cause the processor to perform acts including:
    receiving a first user request to input a note to the computing device from a collection of users using the computing device concurrently;
    determining, in response to the first user request, whether each user in the collection of users is a known user of the computing device or an unknown user of the computing device;
    receiving at the computing device, without unlocking the computing device and in response to determining that at least one user of the collection of users is a known user of the computing device, the note;
    storing the note;
    preventing, while the computing device is locked, other users of the computing device from accessing the note;
    receiving a second user request to edit the note;
    receiving an edit to the note only in response to determining that both the first user request and the second user request are received from a same collection of users;
    receiving an owner request to unlock the computing device;
    authenticating the owner; and
    presenting, in response to the owner request and authenticating the owner, the note.

12. The computing device as recited in claim 11, the acts further comprising preventing the collection of users from leaving a note in response to determining that each user in the collection of users is an unknown user.

13. The computing device as recited in claim 11, the acts further comprising, in response to determining that each user in the collection of users is an unknown user:
    receiving at the computing device, without unlocking the computing device, the note;
    capturing a digital image of the collection of unknown users; and
    storing the note and the digital image of the collection of unknown users.

14. The computing device as recited in claim 11, wherein the second user request is received after receiving the note but prior to presenting the note in response to the owner request.

15. The computing device as recited in claim 11, the acts further comprising recognizing an identity of each user in the collection of users, the storing further including storing an identifier of each user in the collection of users.

16. A system comprising:
    a note input module, implemented at least in part in hardware, to receive a first user request to input a note;
    a user recognition module, implemented at least in part in hardware, to determine, in response to the first user request, whether the user is an owner of a computing device, a known user of the computing device, or an unknown user;
    the note input module being further to receive, without unlocking the computing device, the note in response to the user being the unknown user;
    an image capture device, implemented at least in part in hardware, to capture an image of the unknown user;
    the note input module being further to store the note and the image of the unknown user;

a note access control module, implemented at least in part in hardware, to prevent, while the computing device is locked, other users of the computing device from accessing the note;

a user authentication module, implemented at least in part in hardware, to receive an owner request to unlock the computing device and to authenticate the owner; and a note output module, implemented at least in part in hardware, to present, in response to authenticating the owner, the note and the image of the unknown user at the computing device.

17. The system as recited in claim 16, the computing device including a stylus storage area, and wherein the note input module is to receive, as the first user request, an indication that a stylus has been removed from the stylus storage area.

18. The system as recited in claim 16, wherein the note access control module is further to:

receive owner input to convert the note into a context specific action; and convert, in response to the owner input, the note into the context specific action.

19. The system as recited in claim 16, wherein the note input module is further to:

receive a second user request to edit the note; and receive an edit to the note only in response to determining that both the first user request and the second user request are received from the unknown user.

20. The system as recited in claim 19, wherein:

the image capture device is further to capture an additional image of a user associated with the second user request to edit the note; and the note input module is further to determine that both the first user request and the second user request are received from the unknown user by determining that the additional image and the image of the unknown user both include a same user.

* * * * *